United States Patent [19]

Wilson

[11] Patent Number: 5,075,975

[45] Date of Patent: Dec. 31, 1991

[54] EATING UTENSIL FOR THE MANUALLY IMPAIRED AND GENERAL PUBLIC

[76] Inventor: Mark P. Wilson, 4388 Pasadena Cir., Sarasota, Fla. 34233

[21] Appl. No.: 674,312

[22] Filed: Mar. 25, 1991

Related U.S. Application Data

[63] Continuation of Ser. No. 495,374, Mar. 19, 1990, abandoned.

[51] Int. Cl.[5] ........................ A47J 43/28; B25G 1/00; B25G 1/10

[52] U.S. Cl. ........................................ 30/322; 30/324; 30/327

[58] Field of Search ................. 30/322, 323, 324, 327, 30/340, 142

[56] References Cited

U.S. PATENT DOCUMENTS

| | | | |
|---|---|---|---|
| D. 42,208 | 10/1912 | Stuver | 30/327 |
| D. 169,827 | 6/1953 | Schoenfeld | 30/322 |
| 334,841 | 1/1886 | Bethell | 30/323 |
| 1,347,307 | 7/1920 | Thomas | 30/322 |
| 1,380,247 | 3/1921 | Price | 30/324 |
| 2,496,062 | 1/1950 | Morfesi | 30/322 |
| 2,682,705 | 7/1954 | Johnson | 30/324 |
| 2,725,631 | 12/1955 | Renke | 30/322 |
| 3,224,093 | 12/1965 | Huck | 30/324 |
| 4,035,865 | 7/1977 | McRae | 30/298 |
| 4,325,187 | 4/1982 | Wasson | 30/298 |
| 4,389,777 | 6/1983 | Landsberger | 30/340 |
| 4,821,417 | 1/1989 | Levine | 30/142 |
| 4,896,423 | 1/1990 | Kinsey | 30/322 |

OTHER PUBLICATIONS

Bissell Healthcare Corp., "1989 Professional Healthcare Catalog", 1989, pp. A5-A13.

Arthritis Foundation, "Guide to Independent Living for People with Arthritis", 1988, pp. 79-83.

*Primary Examiner*—Douglas D. Watts

*Assistant Examiner*—Paul M. Heyrana, Sr.

[57] ABSTRACT

An eating utensil for use by the arthritic, neuromuscular impaired, persons lacking various fingers, as well as the general public. The utensil can be easily grasped with the minimal clasping motion by persons with hands of various sizes and possesssing only one finger. The utensil includes a handle (12) which permits the person's index finger (20) and palm to be supported entirely along the upper surface of the utensil. The upper surface of the utensil may or may not be flared (14 and 17) and grooved (15), allowing for maximum weight to be exerted onto the forward end (13) of the utensil be it in the form of a fork or knife.

8 Claims, 1 Drawing Sheet

EATING UTENSIL FOR THE MANUALLY IMPAIRED AND GENERAL PUBLIC

This application is a continuation of application Ser. No. 495,374, filed Mar. 19, 1990, now abandoned.

BACKGROUND

1. Field of Invention

This invention relates to eating utensils for the arthritic, neuromuscular impaired, individuals with loss of fingers as well as the general public.

2. Background of the Invention

For many years devices have been constructed for the manually handicapped to facilitate their feeding themselves. Such devices which employ unusual handles and ways to attach these devices to the hand of the impaired person are often great sources of embarrassment and lack the dignity associated with the normal dining experience using ordinary flatware. Though the arthritic, neuromuscular impaired, and other manually impaired have limitations which require special consideration, it is an aim of this invention to address these specific requirements while maintaining the general characteristics (simplicity and homogeneous construction) associated with the normal eating utensil for the un-impaired.

The present invention allows for the use of the eating utensil with a minimal clasping motion. The location of the tip of the index finger to the forward most part of the handle of the eating utensil, such as a knife or fork, provides the user with complete control. The utensil may be grasped by individuals possessing any one of the five fingers. Also, the configuration of the handle, which may or may not be flared and grooved, provides for maximum contact between the eating utensil, the index finger and the middle of the palm beginning at the metacarpal bone of the index finger and ending at the rear of the palm nearest the wrist. This contact between the utensil and index finger and palm allows for maximum arm weight to be applied to the utensil. The utensil can be constructed of lightweight material in as much as it does not depend on the weight of the utensil to apply maximum pressure to the forward most part of the utensil to facilitate the cutting or forking motion.

Insofar as devices have been constructed to address impairments associated with the arthritic, neuromuscular impaired, and manually impaired, the prior art utensils which have been developed with the foregoing objects in view, lack one or more of the aforementioned features and are consequently unsatisfactory. Most importantly they compromise the simplicity of an eating utensil for use by the general public, and remain devices to be employed predominantly if not exclusively by the manually impaired. It is, therefore, an aim of this invention to provide an improved eating utensil which has the aforementioned described features and which constitutes a vast improvement over the prior art devices without losing its general simplicity of form, homogeneous construction, and hence, general market appeal.

SUMMARY OF THE INVENTION

The present invention contemplates an eating utensil to be used by the manually impaired and non-manually impaired person to overcome the disadvantages of the prior art.

The present invention is a great improvement over prior art as it facilitates eating for both the manually impaired and non-manually impaired while maintaining the aesthetic qualities associated with the finer flatware.

It is an object of the invention to provide an eating utensil which when setting a table for numerous persons in a dining situation will be easy to use by all individuals, whether arthritic, neuromuscular impaired, lacking fingers or un-impaired. The present invention requires no special place setting considerations for the manually impaired.

It is another object of the present invention to provide a utensil which is inexpensive to manufacture and will enable to homogeneous construction to be used by people afflicted with various disabilities.

The utensil includes a fork, spool bowl or knife forward most part which is connected to a handle or curvilinear form. Where the handle meets the forward most part, the width of the handle is sufficient to allow the tip of the index finger to rest comfortably. The handle then flares out to guide and cradle the index finger along its entire length. This portion of the handle may or may not be flared and grooved as illustrated, but is understood to represent the preferred embodiment as here described. The handle then passes across the palm of the hand beginning at the metacarpal of the index finger and passing diagonally across the middle of the palm and ending at the base of the palm near the wrist.

The upwardly curved bottom portion of the handle allows any or all of the remaining fingers to apply the minimum amount of pressure necessary thereto to clasp the utensil.

BRIEF DESCRIPTION OF DRAWINGS

The present invention will be described in further detail below in conjunction with the accompanying drawings in which like numerals refer to like parts and in which.

DETAILED DESCRIPTION OF THE DRAWINGS

Figure 1:
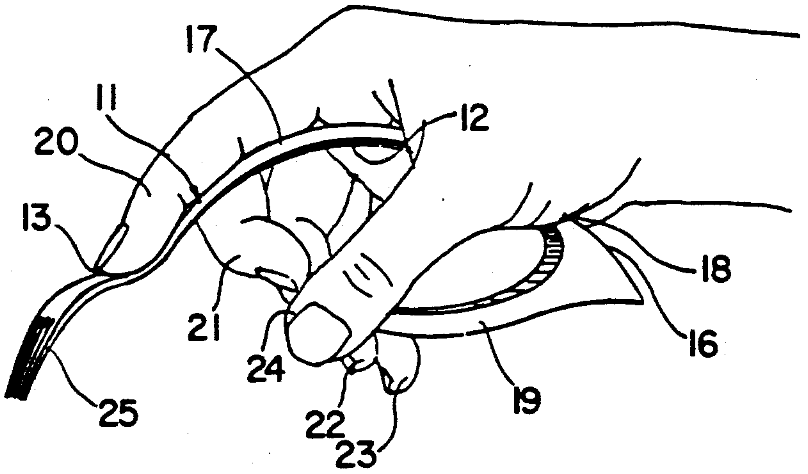
FIG. 1 is a perspective view of the curved eating utensil in use.
Figure 2:
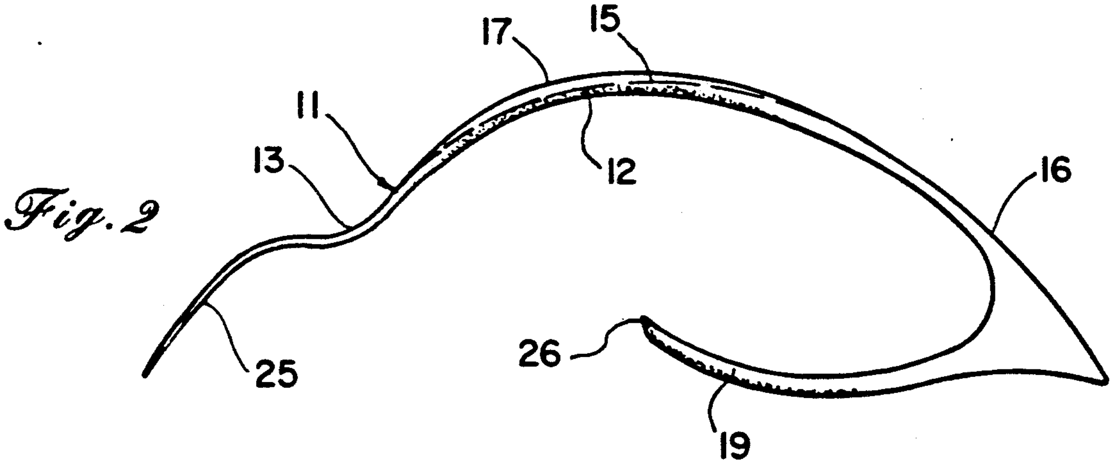
FIG. 2 is a side elevation view of the utensil shown in FIG. 1.
Figure 3:
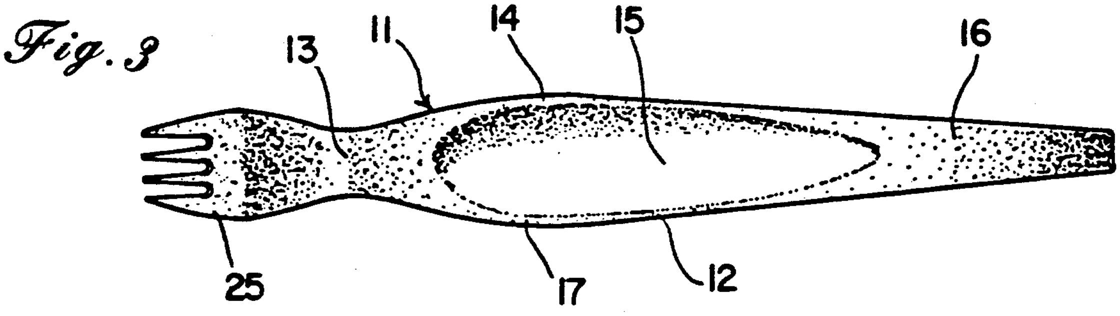
FIG. 3 is a top plan view of the utensil shown in FIG. 1.

FIG. 1 shows the utensil 11 in use. Held in the proper manner, the arm and wrist remain generally parallel with the horizon. As shown, the index finger 20 rests on the forward end joinder portion 13 of the upper, main handle part 12 where the fork, knife or spoon are joined thereto. The end joinder portion between the curved upper handle part and the food engaging implement portion (the fork, spoon or knife) is shaped with a reflex, S-shaped curve passing from the upper handle curvature into the implement portion, e.g., fork 25 in FIG. 2. The reflex curvature of the part forward end portion 13 of handle 12 is sufficiently wide and curving downward, as illustrated in FIG. 3, to comforably support the tip of the index finger in a concave portion of the S-shape joinder part 13 (see FIG. 1). The upper main handle part 12 extends back from the S-shape joinder portion 13 with a continuous curvature directed up and then back and down to the downwardly curved rear part 16. The index finger 20 is cradled by the flared portions 14 and 17 which guide and supports it. The grooved area 15 flanked by the flared portions 14 and 17 which cradle the index finger is best shown by the dotted line 15 in FIG. 2 and the elongated eliptical area 15 denoted in FIG. 3. The downwardly curved part of the rear portion 16 of upper handle part 12 passes across the center of the palm being squeezed by the two parts of the hand located at the base of the thumb and rearend side of the hand, hereafter referred to as the base of the palm 18. Downwardly curved rear portion 16 of handle part 12 extends beyond the base of the palm 18 a distance which varies in relation to the hand size and is best illustrated in FIG. 1. To allow the hand to clasp the utensil, a forwardly directed and upwardly curved, bottom auxiliary handle portion 19 is integral with the rear portion 16 of handle part 12. The lower auxiliary handle part 19 projects forward under the main upper handle part 12 in a gentle curve, first with a slight downward incline, then forward toward the implement part (fork 25) and then with a slight upward incline to terminate in end 26, which end, as shown in FIG. 2, is located approximately midway between the front end and the rear end of the utensil and is spaced-apart from the under side of the upper handle part and thereby allows one or more of fingers 21, 22, 23, and 24, to apply pressure thereunder. As depicted in FIG. 2, the forward portion of the auxiliary handle part 19 is spaced-apart from the upper handle part 12 a distance which is approximately one-third of the length of the upper handle part 12 from the joinder portion 13 at the front end of the upper handle to the end of the rear portion 16. The clasping of the utensil and consequently its use, can be achieved with the index finger and any combination of fingers 21, 22, 23, and 24, individually or together. The utensil can be used equally as well with the middle finger 21 replacing the function of the index finger 20. A person lacking all but one finger may grasp the utensil by applying pressure to the downwardly curved rear portion 16 with the palm of the hand while applying pressure to the upwardly curved bottom portion 19 of handle 12 with the remaining finger.

FIG. 2 shows the side elevation view of the utensil. Since the utensil is symetrical about the long axis, the opposite side elevation is identical to FIG. 2. Handle 12 has attached to the forward end thereof a food supporting portion 25 in the form of a fork, spoon bowl or knife, which is adapted to hold, support or cut food.

Figure 4:
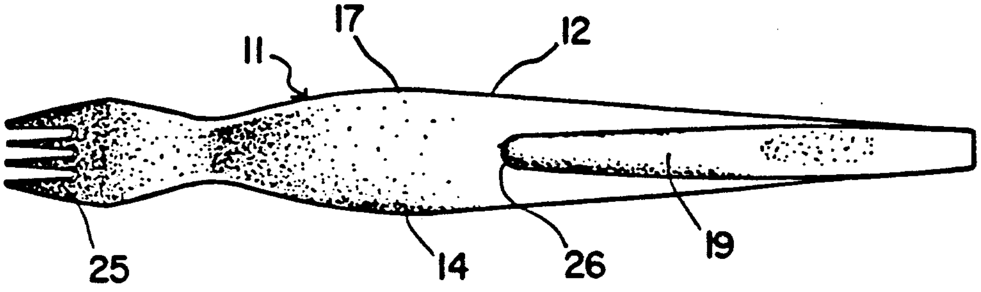
FIG. 4 is a bottom plan view of the utensil.

FIG. 4 shows the bottom plan view, illustrating the flared portions 14 and 17, which are sufficiently rounded to accomodate the side of any finger making contact therewith. The upwardly curved portion 19 is sufficiently rounded on the bottom side to accomodate the clasping motion thereupon, as best indicated in FIGS. 1 and 4.

While the various portions and parts of the utensil have been described as being attached together, it is to be understood that term is sufficiently broad to encompass a utensil which is molded or otherwise formed out of a homogeneous material such as wood, metal, plastic, or the like.

While the invention has been illustrated and described in detail in the foregoing description and drawings, the same is to be considered as illustrative and not to be considered a limitation upon the invention. It is understood that the preferred embodiment has been shown and that changes may be made. For example, portions 14, 17 and 15, may or may not be flared or grooved. All changes and modifications that do not depart from the essence of the invention are desired to be protected.

I claim:

1. An integral eating utensil having a front end and a rear end and comprising: at the forward portion including said front end, an implement portion for engagement with food; an elongate, rearwardly directed, widened main handle part extending back from said forward implement portion with a curvature directed up and then back and down to join to said rear end; a further, curved auxiliary handle part under said main handle part, extending forward from said rear end in a gentle curve, first passing slightly down, then forward toward said implement portion and slightly upward to a terminal end, said terminal end being spaced-apart from said main handle part and located approximately midway between the front end and the rear end of the utensil; and the joinder portion between the implement portion and said rearwardly directed main handle part having a reflex S-shape curve from said handle curvature curving downward into said implement portion.

2. An eating utensil as defined in claim 1, wherein said curved auxiliary handle part has a length from its said terminal end to said rear end of the utensil which is approximately equal to one-half of the length dimension of said main handle part measured from said joinder portion to the utensil rear end.

3. An eating utensil as defined in claim 1, the forward portion of said auxiliary handle part being spaced-apart below said main handle part a distance approximately one-third of the length of said main handle part measured from said joinder portion to the utensil rear end.

4. An eating utensil as defined in claim 1, wherein said S-shaped reflex joinder portion is flat in a direction transverse to the elongate extent of said main handle part.

5. An eating utensil as defined in claim 1, wherein an elongate upper portion of said main handle part has a grooved contour enabling the index finger of a user to rest therein.

6. An eating utensil as defined in claim 1, wherein said main handle part is tapered from its uppermost portion to its rearwardmost portion.

7. An eating utensil as defined in claim 1, wherein said implement portion for engagement with food is a multi-tined fork member.

8. An eating utensil as defined in claim 1, wherein said rear end includes a rear utensil portion with a downward curvature from a joinder with said main handle part; and the curved distance along said elongate main handle part from the reflex curve joinder portion to where the main handle joins said rear utensil portion has a length approximately the distance from the tip of the index finger of a users hand to the heel of the palm of that hand adjacent the adjoining wrist.

* * * * *